United States Patent [19]

Wilson

[11] 4,025,126
[45] May 24, 1977

[54] BRAKE CONTROL VALVE DEVICE WITH MOVABLE CONTROL RESERVOIR CHARGING VALVE

[75] Inventor: Richard L. Wilson, Monroeville, Pa.

[73] Assignee: Westinghouse Air Brake Company, Wilmerding, Pa.

[22] Filed: Jan. 19, 1976

[21] Appl. No.: 650,297

[52] U.S. Cl. .................................. 303/33; 303/36; 303/64; 303/69; 303/80
[51] Int. Cl.² ........................................ B60T 11/34
[58] Field of Search .................. 303/28, 36, 64, 68, 303/69, 80, 81, 86, 84 R, 84 A, 22 A

[56] References Cited

UNITED STATES PATENTS

| 141,685 | 8/1873 | Westinghouse, Jr. | 303/33 |
| 1,919,423 | 7/1933 | Farmer | 303/64 |
| 2,457,578 | 12/1948 | Maliphant | 303/84 R |
| 2,992,861 | 7/1961 | Hursen | 303/64 X |
| 3,639,010 | 2/1972 | Mayer | 303/22 A |

Primary Examiner—George E. A. Halvosa
Attorney, Agent, or Firm—W. F. Poore; R. W. McIntire, Jr.

[57] ABSTRACT

A brake control valve device operated by a reduction in brake pipe pressure on one side of a movable abutment relative to control reservoir pressure on the opposite side embodies in the abutment a control reservoir charging valve mechanism, a filter and a choke arranged in series. The valve mechanism comprises a spring-biased valve slidably mounted in a ported bushing carried by the abutment. Two spaced-apart stops carried on the abutment enable relative movement between the abutment and the valve whereby, in one position of the valve, fluid under pressure may flow from the brake pipe to the control reservoir to effect charging thereof via the ported bushing, a passageway in the valve and the choke, and, in a second position of this valve, this charging communication is closed.

10 Claims, 1 Drawing Figure

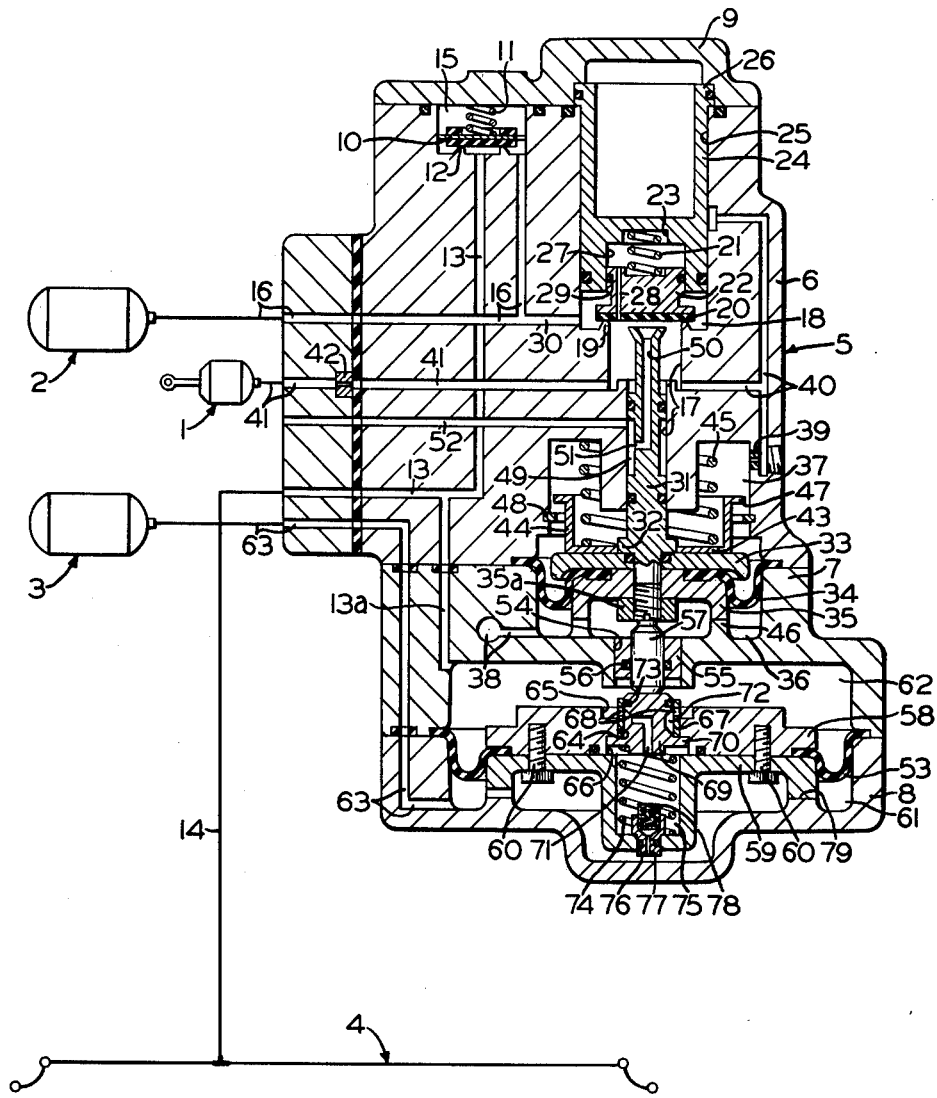

BRAKE CONTROL VALVE DEVICE WITH MOVABLE CONTROL RESERVOIR CHARGING VALVE

BACKGROUND OF THE INVENTION

There is shown in U.S. Pat. No. 3,639,010, issued Feb. 1, 1972 to Gary T. Mayer et al, and assigned to the assignee of the present application, a graduated release type brake control valve device that is operable in response to a reduction of the brake pipe pressure effective on one side of an abutment relative to a substantially constant pressure in a control reservoir that is charged from the brake pipe via a one-way flow valve, there being no means disclosed to provide for flow of fluid under pressure from the control reservoir to the brake pipe should the pressure in the control reservoir exceed the pressure in the brake pipe.

As a practical matter, the volume of the train brake pipe is considerably in excess of the volume of the control reservoir on each individual car in a train. Moreover, the pressure in a normally charged train brake pipe is maintained at a substantially constant value by a self-lapping type control valve device that is embodied in the engineer's brake valve device located on a locomotive for controlling operation of a brake control valve device provided on each car in the train hauled thereby. Therefore, upon an increase in the temperature of the ambient air, the resulting increase in the pressure of the fluid in each control reservoir will be considerably in excess of the increase of the pressure in the train brake pipe. Accordingly, this excess of control reservoir pressure over that of train brake pipe pressure will cause the brake control valve device on the cars to operate to effect an undesired brake application.

Moreover, the normal fully charged pressure carried in the brake pipe and, therefore, in the control reservoirs of the cars in one type of train, such as a passenger train, is considerably in excess of the normal fully charged pressure carried in the brake pipe of another type of train, such as a freight train.

Furthermore, the normal fully charged pressure carried in the brake pipe of any particular type of train operated by one railway company may be considerably in excess of the normal fully charged pressure carried in the brake pipe of the same type of train operated by another railway company. Accordingly, a brake release is not obtained when a railway car set off from a train having a high normal fully charged brake pipe pressure is subsequently coupled into a train having a lesser normal fully charged brake pipe pressure for the reason that this pressure is less than the pressure of the fluid in the control reservoir on this car.

Also, as a practical matter, occasional erratic operation of the self-lapping type control valve device that is embodied in the engineer's brake valve device will cause the pressure maintained in the brake pipe to be less than the normal fully charged pressure carried therein. Therefore, assuming that the control reservoir has been charged to the normal fully charged pressure carried in the brake pipe prior to erratic operation of the self-lapping control valve device to maintain a lesser pressure in the brake pipe, it is apparent that this lesser pressure maintained in the brake pipe is ineffective to cause a complete brake release which, of course, is undesirable.

Accordingly, it is the general purpose of the present invention to provide an abutment that operates a brake control valve device in response to a reduction in brake pipe pressure on one side thereof relative to control reservoir pressure on the opposite side with a valve mechanism and a choke that are operatively effective in response to an increase in the pressure of the fluid under pressure in the train brake pipe to a value in excess of the pressure of the fluid under pressure present in the control reservoir to establish a communication via which fluid under pressure may flow from the brake pipe to the control reservoir to effect charging thereof, and operatively effective to close this communication upon a subsequent decrease in the pressure of the fluid under pressure in the brake pipe thereby rendering the brake control valve device operative by the pressure in the control reservoir to effect a brake application.

SUMMARY OF THE INVENTION

According to the present invention, a double-abutment pressure-operated graduated release type brake control valve device for use on railway and rapid transit vehicles is operated by a reduction in the pressure of the fluid under pressure in a train brake pipe and effective on one side of one of the abutments relative to a substantially constant control reservoir pressure on the other side of this abutment to effect a brake application.

The control reservoir is charged from the brake pipe via a charging valve mechanism and a choke arranged in series and mounted on the one abutment for movement therewith. This valve mechanism comprises a spring-biased spool-type valve having an outwardly extending flange that provides limited movement of the spool-type valve between two spaced-apart stops on the one abutment. The spool-type valve is slidably mounted in a ported bushing that is carried by the abutment and provided with a passageway extending therethrough whereby, when the flange is spring-biased against one stop, fluid under pressure may flow from the train brake pipe to the control reservoir via the ported bushing, this passageway and the choke thereby enabling charging of the control reservoir to the pressure carried in the brake pipe and back flow from the control reservoir to the brake pipe at a rate determined by the size of the choke should control reservoir pressure for any reason exceed brake pipe pressure.

One end of the spool-type valve abuts a cylindrical member disposed therebetween and one side of the other of the two abutments, which is subject on its other side to the force of a strong spring. Therefore, a reduction in the train brake pressure effective on the one side of the one abutment to cause a brake application, renders control reservoir pressure present on the other side of this one abutment effective to shift the ported bushing carried thereby relative to the spool-type valve until a seal member carried adjacent the one end of this valve is disposed below the ports in the bushing thereby closing communicaton between the brake pipe and the control reservoir and thus rendering the brake control valve device operative by the pressure in the control reservoir to effect a service brake application.

In the accompanying drawing:

The single FIGURE is a piping diagram showing a fluid pressure brake control apparatus; a novel service brake control valve device thereof being shown in section.

DESCRIPTION

As shown in the drawing, the fluid pressure brake control apparatus for use on a railway or rapid transit vehicle comprises a brake cylinder 1, an auxiliary reservoir 2, a control reservoir 3, a brake pipe 4, and a novel service brake control valve device 5.

The brake control valve device 5 comprises a pair of casing sections 6 and 7, a bottom cover member 8 and a top cover member 9 secured together by any suitable means (not shown). Interposed between a flat disc-type auxiliary reservoir charging check valve 10 and the top cover 9 is a spring 11 that normally biases this check valve 10 against an annular valve seat 12 formed adjacent one end of a passageway 13 in the casing section 6. Connected to the opposite end of this passageway 13 is one end of a branch pipe 14 that has its opposite end connected to the brake pipe 4 intermediate the ends thereof. As the pressure in the passageway 13 increases, the flat disc-type valve 10 is moved away from the annular valve seat 12 to provide for a one-way flow of fluid under pressure from the passageway 13 to an outlet chamber 15. This outlet chamber 15 is in constant communication with the auxiliary reservoir 2 by way of a passageway and corresponding pipe 16.

During initial charging of the auxiliary reservoir 2 and during recharging of this reservoir after a brake application, whenever the pressure of fluid in brake pipe 4 exceeds the pressure in the auxiliary reservoir 2, the flat disc-valve 10 will be unseated from the annular valve seat 12 whereupon fluid under pressure will flow from the brake pipe 14 to the auxiliary reservoir 2 via branch pipe 14, passageway 13, pass the unseated flat disc-type valve 10 to the outlet chamber 15 and thence through the passageway and corresponding pipe 16, until the auxiliary reservoir 2 is charged to substantially the pressure normally carried in the brake pipe 4.

The service brake control valve device 5 serves to control the supply of fluid under pressure from the auxiliary reservoir 2 to the brake cylinder 1, when a brake application is effected, and from the brake cylinder to atmosphere upon effecting a release of the brakes, and is constructed to be responsive to variations in the brake pipe pressure to be movable to a service position, a lap position, and a brake release position.

The casing section 6 of the service brake control valve device 5 is provided with a stepped bore 17 which opens at its lower end at the lower side of the casing section 6 and opens at its upper end into a chamber 18 formed by the cooperative relationship of the casing section 6 and the upper cover 9. At the upper end of the bore 17 there is formed an annular valve seat 19 against which is normally biased a resilient flat disc-type valve 20 by a spring 21 interposed between a piston member 22 to which this valve 20 is bonded and a bottomed bore 23 in a guide bushing 24. This bushing 24 is disposed in a counterbore 25 provided therefor in the casing section 6 and has integral therewith at its upper end an outturned flange 26 that is clamped between the upper end of the casing section 6 and the top cover member 9.

As shown in the drawing, the bushing 24 is provided with a counterbore 27 in which the piston member 22 is slidably disposed. A small bore 28 extends through the valve 20 and piston member 22 to prevent dash pot action, and an o-ring seal 29 carried in a peripheral annular groove provided therefor in the piston member 22 prevents leakage of fluid under pressure from the chamber 18 into the counterbore 27.

Opening into the chamber 18 is one end of a passageway 30 that extends through the casing section 6 and opens into the hereinbefore-mentioned passageway 16 intermediate the ends thereof so that fluid under pressure may be constantly supplied from the auxiliary reservoir 2 the chamber 18 via pipe and corresponding passageway 16 and passageway 30.

Slidably mounted in the stepped bore 17 is a valve stem 31 that intermediate its ends is provided with a collar 32 that abuts a diaphragm follower 33. The inner periphery of an annular diaphragm 34 is clamped between this diaphragm follower 33 and a diaphragm follower plate 35 that is secured to the diaphragm follower 33 by a nut 35a which has screwthreaded engagement with screw threads provided therefor on the lower end of the stem 31. The outer periphery of the diaphragm 34 is clamped between the casing sections 6 and 7.

The diaphragm 34 cooperates with the casing sections 6 and 7 to form within the brake control valve device 5 and on opposite sides of the diaphragm 34 a first pair of chambers 36 and 37. The chamber 36 is open to atmosphere via a passageway 38 that extends through the casing section 7 to the exterior surface thereof, and the chamber 37 is connected to the brake cylinder 1 via a choke 39, a passageway 40, the larger diameter portion of the stepped bore 17, and a passageway and correspondingly numbered pipe 41. A choke 42 is disposed in the passageway 41, the size of this choke 42 being such as to provide for the proper rate of buildup of brake cylinder pressure when a brake application is effected in a manner hereinafter explained.

As shown in the drawing, an inturned flange 43 formed on the lower end of a spring seat 44 abuts the upper side of the diaphragm follower 33, and a spring 45 is interposed between this flange 43 and the casing section 6 to normally bias the diaphragm follower plate 35 against a stop 46 formed on the casing section 7. The upper end of the spring seat 44 is provided with an outturned flange 47 that is disposed above a snap ring 48 which is inserted into an annular groove provided therefor in the wall of the chamber 37. This snap ring 48 and outturned flange 47 prevent the spring 45 from ejecting the valve stem 31 from the stepped bore 17 when the casing section 7 is disconnected from the casing section 6 when repairing or replacing broken or defective parts of the brake control valve device 5.

The valve stem 31 has formed thereon intermediate its ends an elongated peripheral annular groove 49 which, as shown in the drawing illustrating the relative positions of the parts of the brake control valve device 5 in the brake release position, is so located and arranged that the brake cylinder 1 is open to atmosphere via the pipe and passageway 41, the upper portion of stepped bore 17, a bottomed bore 50 and a port 51 formed in the valve stem 31, the groove 49 thereon, and a passageway 52 that at one end opens at the wall surface of the stepped bore 17 and at the other end is open to atmosphere.

The annular diaphragm 34 is operatively connected to a second annular diaphragm 53 in a manner now to be described.

As can be seen from the drawing, the casing section 7 is provided with a bore 54 in which is press-fitted a bushing 55. The interior of bushing 55 is provided with an annular groove in which is disposed an O-ring seal 56 that forms a seal with the periphery of a plunger 57 slidably mounted within this bushing. This O-ring seal 56 prevents leakage of fluid under pressure into the chamber 36 which is open to atmosphere via the passageway 38.

The outer periphery of the diaphragm 53 is clamped between the casing section 7 and the bottom cover member 8 and the inner periphery is clamped between an annular diaphragm follower 58 and a cup-shaped diaphragm follower plate 59 that is secured to the diaphragm follower 58 by a plurality of cap screws 60, only two of which appear in the drawing, that pass through corresponding smooth bores in the follower plate 59 and have screw-threaded engagement with coaxial screw-threaded bottomed bores provided therefor in the diaphragm follower 58.

The diaphragm 53 cooperates with the casing section 7 and the bottom cover 8 to form within the brake control valve device 5 and on the opposite sides of the diaphragm 53 a second pair of chambers 61 and 62. Opening into the chamber 62 above the diaphragm 53 is one end of a branch passageway 13a of the passageway 13 so that the chamber 62 is charged with fluid under pressure from the brake pipe 4 via the branch pipe 14, this passageway 13 and the branch passageway 13a.

Opening into the chamber 61 below the diaphragm 53 is one end of a passageway 63 that extends through the bottom cover member 8 and casing sections 7 and 6, and is connected by a correspondingly numbered pipe to the control reservoir 3.

According to the present invention, in order to provide for the charging of the control reservoir 3 from the brake pipe 4, the diaphragm follower 58 and diaphragm follower plate 59 embody therein a control reservoir charging valve mechanism and a dissipation choke which now will be discribed.

As shown in the drawing, the diaphragm follower 58 is provided with a bore 64 that extends therethrough and two coaxial counterbores 65 and 66 that extend inward from the respective opposite sides thereof. Press-fitted into the bore 64 is a bushing 67 the length of which is greater than the length of the bore 64 so that the upper end thereof extends into the counterbore 65. That portion of the bushing 67 that extends into the counterbore 65 is provided with a plurality of arcuately spaced-apart ports 68, two of which appear in the drawing.

Slidably mounted in the busing 67 is a spool-type valve member 69 that, intermediate its ends, is provided with an outturned cylindrical flange 70. The diameter of this flange 70 is slightly less than the diameter of the cunterbore 66. To enable this flange 70 to be slidable a chosen distance within the counterbore 66, the thickness of this flange is substantially less than the length of this counterbore 66. It will be noted from the drawing that the diaphragm follower plate 59 serves as a stop to limit the downward movement of this flange 70 and the valve member 69, and that the upper end of the counterbore 66 constitutes a stop to limit their upper movement.

It will be further noted from the drawing that the valve member 69 is provided with a passageway 71 that at one end opens at the lower end thereof and at its other end opens at the bottom of an elongated peripheral annular groove 72 that is formed thereon above the outturned flange 70 and below a peripheral annular groove adjacent the upper end thereof in which groove is disposed an O-ring seal 73.

In order to normally maintain the valve member 69 in the position shown in which the upper end thereof abuts the lower end of the plunger 57 and the outturned flange 70 thereon abuts the upper end of the counterbore 66, a spring 74, which is lighter than the spring 45, is interposed between this flange 70 and the bottom of the cup-shaped portion of the diaphragm follower plate 59.

While the spring 74 biases the flange 70 against the upper end of the counterbore 66, the groove 72 on the valve member 69 is in alignment with the ports 68 in the bushing 67 thus establishing a communication from the chamber 62 to a chamber 75 formed by the cooperative relationship of the cup-shaped portion of the diaphragm follower plate 59, the lower end of the valve member 69 and the outturned flange 70 thereon.

As shown in the drawing, extending through the bottom of the cup-shaped portion of the diaphragm follower plate 59 is a bore 76 in which is secured, as, for example, by a pressfit, a choke fitting 77. This choke fitting 77 may be the same in construction as the choke fitting shown in U.S. Pat. No. 2,457,578, issued Dec. 28, 1948 to Charles W. Maliphant, and assigned to the assignee of the present application. As disclosed in this patent, this choke fitting 77 embodies therein a fluid straining element 78.

OPERATION

Assume initially that all the passageways and chambers in the brake control valve device 5 shown in the drawing are devoid of fluid under pressure. Therefore, the springs 45 and 74 are effective to bias the parts of the brake control valve device 5 to the position shown in the drawing in which the diaphragm follower plate 59 abuts a stop 79 formed on the bottom cover member 8.

Accordingly, the brake apparatus may now be charged by the engineer moving the handle of a brake valve device (not shown) to its release position. It may be assumed that this brake valve device is of the type described in U.S. Pat. No. 2,958,561, issued Nov. 1, 1960 to Harry C. May, and assigned to the assignee of the present application. Accordingly, the relay valve of this brake valve device operates in the manner described in the aforesaid patent to supply fluid under pressure from a main reservoir (not shown) on a locomotive to the train brake pipe which extends from end to end of the locomotive and back through each car in a train hauled thereby.

Fluid under pressure flows from the brake pipe 4 to the lower side of the check valve 10 via the branch pipe 14 and passageway 13 and is effective to unseat this valve 10 from its seat 12. When valve 10 is thus unseated from seat 12, fluid under pressure will flow from passageway 13 to the chamber 15 and thence to the auxiliary reservoir 2 via passageway and pipe 16. Fluid under pressure is thus supplied to the auxiliary reservoir 2 until the pressure therein is substantially the same as the normal fully charged pressure in the train brake pipe, which, for example, may be 70 pounds per square inch.

Fluid under pressure supplied from the brake pipe 4 to the passageway 13 will also flow to the chamber 62 above the diaphragm 53 via branch passageway 13a. While the parts of the brake control valve device 5 occupy the position in which they are shown in the drawing, fluid under pressure supplied to the chamber 62 above the diaphragm 53 will flow to the chamber 61 below this diaphragm 53 via ports 68 in bushing 67, groove 72 on and passageway 71 in valve member 69, chamber 75 and choke fitting 77, and thence to the control reservoir 3 via passageway and pipe 63 until the pressure in the chamber 61 and the control reservoir is increased to the normal fully charged pressure carried in the brake pipe 4, it being noted that the size of the choke fitting 77 determines the rate at which the chamber 61 and the control reservoir 3 are charged.

Initiation of a service brake application may now be effected by the engineer moving the handle of the brake valve device from its release position into its application zone to a position corresponding to the degree of brake application desired whereupon the relay valve of the brake valve device operates in the manner fully described in detail in hereinbefore-mentioned U.S. Pat. No. 2,958,561 to effect a reduction in the pressure in the train brake pipe and therefore in the brake pipe 4 and the chamber 62 above the diaphragm 53 of the brake control valve device 5 at a service rate.

The size of the choke fitting 77 is such that the flow of fluid under pressure therethrough is less than a service rate. Therefore, fluid under pressure cannot flow from the chamber 61 to the chamber 62 and thence to the brake pipe 4 via this choke fitting 77, chamber 75, passageway 71 in and groove 72 on valve member 69, and ports 68 in bushing 67 as fast as fluid under pressure is flowing from the chamber 62 to atmosphere via the train brake pipe and the brake valve device.

Accordingly, it is apparent that the pressure in the chamber 61 will quickly exceed the pressure in the chamber 62 and that this higher pressure in the chamber 61 will deflect the diaphragm 53 in an upward direction, as viewed in the drawing. Since the spring 74 is lighter than the spring 45, as hereinbefore stated, the initial upward deflection of the diaphragm 53 will shift the diaphragm follower 58, bushing 67 and diaphragm follower plate 59 upward relative to the plunger 57 and valve member 69 until the flange 70 on this valve member 69 abuts the diaphragm follower plate 59.

As the diaphragm follower 58 and bushing 67 are thus sifted upward relative to valve member 69 until flange 70 abuts diaphragm follower plate 59, the ports 68 in the bushing 67 are moved to a position in which the O-ring seal 73 carried by this valve member 69 forms a seal with the wall surface of the bushing 67 at a location below the ports 68 in this bushing.

While the O-ring seal 73 forms a seal with the bushing 67 a location below the ports 68 in this bushing, communication is cut off between chambers 61 and 62.

As the pressure in the chamber 62 continues to be reduced by flow of fluid under pressure therefrom to atmosphere via the train brake pipe and the brake valve device, the difference in the pressures in the chambers 61 and 62 will increase to further deflect the diaphragm 53 in an upward direction.

Since the flange 70 on the valve member 69 now abuts the diaphragm follower plate 59, this upward deflection of the diaphragm 53, diaphragm follower 58, bushing 67, valve member 69 and diaphragm follower plat 59 is transmitted to the valve stem 31 via the plunger 57 to move this stem 31 upward and cause the upper end of this stem to first contact the bottom face of the valve 20 to thereby close communication between the brake cylinder 1 and atmosphere.

As the stem 31 continues to be moved upward, the valve 20 will be unseated from its seat 19. By unseating of valve 20 from its seat 19, a communication is established through which fluid under pressure is permitted to flow from the auxiliary reservoir 2 to the brake cylinder 1 via pipe and passageway 16, passageway 30, chamber 18, thence past annular valve seat 19, and through the stepped bore 17 and passageway and pipe 41.

It will be noted from the drawing that some of the fluid under pressure supplied to the steped bore 17 flows therefrom to the chamber 37 via the passageway 40 and choke 39 therein.

Fluid under pressure spplied to the chamber 37 in the manner explained above will increase the pressure therein and act in a downward direction on the effective area of diaphragm 34.

Upon the combined force of the spring 45 and the increasing fluid pressure force acting downward on the effective area of the diaphragm 34 slightly exceeding the force acting upward on the diaphragm 53 as the result of the reduction of the pressure in the chamber 62, the stem 31, plunger 57, valve member 69, diaphragm follower 58 and diaphragm follower plate 59 will be moved downwward until the spring 21 acting via the piston member 22 seats the valve 20 on its seat 19. This cuts off flow of fuid under pressure from the auxiliary reservoir 2 to the brake cylinder 1 and chamber 37.

Since the operation of the brake control valve device 5 is the same in effecting either a partial or a complete release of the brakes, it is believed that a description of one will suffice for both, it being understood that when a partial release of the brakes is effected, the pressure in the train brake pipe is not increased to its normal fully charged chosen pressure, and all the fluid under pressure in the brake cylinder 1 is not released to atmosphere as is the case when a complete release is effected.

Let it be supposed that the engineer now desires to effect a complete brake release. Accordingly, he will move the handle of the brake valve device from the position it occupies in its application zone back to its release position.

As this handle is thus returned to its release position, the brake pipe 4 is charged in the maner described in the hereinbefore-mentioned U.S. Pat. No. 2,958,561.

Fluid under pressure flows from the brake pipe 4 via the check valve 10 to charge the auxiliary reservoir 2 to the pressure carried in the train brake pipe in the manner hereinbefore described.

Fluid under pressure also flows to the chamber 62 in the manner hereinbefore described. It will be understood that the pressure in the chamber 62 is less than that in the chamber 61 for the reason that the pressure in this chamber 62 was reduced when the brake application was effected in the manner described above. Accordingly, as fluid under pressure flows from the brake pipe 4 to the chamber 62, the pressure in this chamber 62 will increase.

Upon the pressure in the chamber 62 increasing to a value that is greater than the pressure in the chamber 61, a fluid pressure force is established which acts in a downward direction on the effective area of the diaphragm 53. Therefore, upon the pressure in the chamber 62 and the brake pipe 4 reaching the normal fully charged brake pipe pressure, this pressure v˙¨¹ deflect the diaphragm 53 downward to thereby shift the diaphragm follower 58, bushing 67, and diaphragm follower plate 59 downward relative to the plunger 57 and spool valve 69 until the upper end of the counterbore 66 in the diaphragm follower 58 abuts the flange 70 on the valve member 69.

When the diaphragm follower 58 is thus shifted downward until the upper end of the counterbore 66 abuts the flange 70, a communication is again established between the chambers 62 and 61 via the ports 68 in bushing 67, groove 72 on and passageway 71 in valve member 69, chamber 75 and choke fitting 77.

It will be noted that upon further downward movement of the diaphragm follower 58 and diaphragm follower plate 59, the valve member 69 will be moved downward therewith since the flange 70 now abuts the upper end of the counterbore 66.

It is apparent that as the valve member 69 is thus moved downward, the spring 45 and fluid under pressure in the chamber 37 are rendered effective to shift the valve stem 31 and plunger 57 downward to maintain the lower end of this plunger 57 against the upper end of the valve member 69. Accordingly, the valve stem 31, plunger 57, valve member 69, diaphragm follower 58 and diaphragm follower plate 59 will all be moved downward until the diaphragm follower plate 59 abuts the stop 79 on the bottom cover member 8.

Fluid under pressure will now flow from the brake cylinder 1 to atmosphere via pipe and pasageway 41, choke 42, stepped bore 17, bottomed bore 50, port 51, groove 49 and passageway 52 until all fluid under pressure is released from the brake cylinder 1 thereby releasing the brakes on the vehicle.

Since the chamber 37 is connected to the interior of the stepped bore 17 by the choke 39 and passageway 40, fluid under pressure will be released from the chamber 37 to atmosphere at a rate determined by the size of the choke 39 simultaneously as fluid under pressure is released from the brake cylinder 1 to atmosphere.

It wll be noted that upon effecting a brake application in the manner described above, the fluid under pressure in the control reservoir 3 and the chamber 61 are trapped therein. Therefore, upon effecting a brake release, the pressure in the control reservoir 3 and the chamber 61 is usually the same as the normal fully charged brake pipe pressure. Accordingly, there would normally be no flow of fluid under pressure from the brake pipe 4 to the control reservoir 3 upon return of the parts of the brake control valve device 5 to their release position in which they are shown in the drawing.

If, however, the pressure in the control reservoir 3 and the chamber 61 have been reduced by, as, for example, leakage to a value less than the normal fully charged brake pipe pressure, then, upon the return of the parts of the brake control valve device 5 to their release position, as shown in the drawing, fluid under pressure will flow from brake pipe 4 and chamber 62 to the control reservoir 3 via ports 68 in bushing 67, groove 72 on and passageway 71 in valve member 69, chamber 75, choke fitting 77, chamber 61 and passageway and pipe 63 at a rate determined by the size of the choke 77 until the pressure in the control reservoir 3 and chamber 61 is equal to the normal fully charged brake pipe pressure present in the brake pipe 4.

Having now described the invention, what I claim as new and desire to secure by Letters Patent, is:

1. A fluid pressure controlled vehicle brake apparatus comprising, in combination:
    a. a normally charged brake pipe, variations of the pressure of the fluid in said brake pipe being effective to control brake applications and brake releases on the vehicle,
    b. an auxiliary reservoir normally charged to the pressure carried in said brake pipe,
    c. a control reservoir normally charged to the pressure carried in said brake pipe,
    d. fluid pressure operated braking means for effecting a brake application on the vehicle, and
    e. a fluid pressure operated brake control service valve device comprising:
        i. valve means operable to effect the supply of fluid under pressure from said auxiliary reservoir to said fluid pressure operated braking means and the release of fluid under pressure from said fluid pressure operated braking means to atmosphere,
        ii. a stem coaxially arranged with respect to said valve means for effecting the operation thereof,
        iii. a first movable abutment subject on one side to the pressure of fluid in said brake pipe and subject on the opposite side to the pressure in said control reservoir, said first movable abutment being operatively connected to said stem to effect its movement in one direction in response to a reduction in brake pipe pressure on said one side relative to control reservoir pressure on said opposite side to cause one end of said stem to operate said valve means to effect the supply of fluid under pressure from said auxiliary reservoir to said braking means to cause a brake application on the vehicle, wherein the improvement comprises:
        iv. control reservoir charging valve means carried on and so operable by said first movable abutment in response to said reduction in brake pipe pressure as to cut off charging of said control reservoir and in response to an increase in the pressure of the fluid in said brake pipe to the pressure of the fluid in said control reservoir to enable charging of said control reservoir, and
        v. a second movable abutment subject on one side to the fluid under pressure supplied by said valve means to said braking means and subject on the opposite side to atmospheric pressure, said second movable abutment being so connected to said valve stem as to effect movement of said stem in a direction opposite said one direction in response to the force of fluid under pressure acting on said second abutment in said opposite direction slightly exceeding the fluid pressure force acting in said one direction on said first movable abutment to cause operation of said valve means to cut off flow of fluid under pressure from said auxiliary reservoir to said braking means without causing operation of said charging valve means to effect charging of said control reservoir, said first movable abutment being responsive to a subsequent increase in brake pipe pressure on said one side thereof to effect further movement of said stem in said opposite direction to cause said valve means to establish a venting communication whereby the fluid under pressure supplied to said braking means is released to atmosphere, and operation of said control reservoir charging valve means to enable charging of said control reservoir.

2. A fluid pressure controlled vehicle brake apparatus, as recited in claim 1, further characterized by a restricted means for controlling the rate of flow of fluid under pressure to and from said control reservoir.

3. A fluid pressure controlled vehicle brake apparatus, as recited in claim 1, further characterized by a restricted means carried on said first movable abutment for controlling the rate of flow of fluid under pressure to and from said control reservoir.

4. A fluid pressure controlled vehicle brake apparatus, as recited in claim 1, further characterized by a restricted means carried on said first movable abutment in series relation with said control reservoir charging valve means for controlling the rate of flow of fluid under pressure to and from said control reservoir.

5. A fluid pressure controlled vehicle brake apparatus, as recited in claim 1, further characterized by a restricted means and a filtering means so arranged and carried on said first abutment as to respectively control the rate of flow of fluid under pressure supplied by said control reservoir charging valve means to said control reservoir and the removal of contaminants from said fluid under pressure.

6. A fluid pressure controlled vehicle brake apparatus, as recited in claim 1, further characterized in that said control reservoir charging valve means comprises:
   a. a ported bushing carried by said first movable abutment,
   b. a valve member slidably mounted in said bushing and provided with a passageway therein and a seal member adjacent one end thereof,
   c. a pair of spaced-apart stops providing two positions of said ported bushing relative to said valve member whereby, in one of said positions, said seal member is disposed on one side of said ports in said bushing to enable flow of fluid under pressure from said brake pipe to said control reservoir via said ports and said passageway, and, in the other of said positions, said seal member is disposed on the other side of said ports, to prevent flow of fluid under pressure from said brake pipe to said control reservoir, and
   d. biasing means for normally biasing said valve member to its said one position.

7. A fluid pressure controlled vehicle brake apparatus, as recited in claim 6, further characterized by means interposed between the other end of said stem and said one end of said valve member to provide an operative connection between said first movable abutment and said stem subsequent to movement of said first abutment and said ported bushing relative to said valve member the distance between said two spaced-apart stops in response to an initial reduction in brake pipe pressure whereby a further reduction in brake pipe pressure causes said stem to effect operation of said valve means to supply fluid under pressure from said auxiliary reservoir to said fluid pressure operated braking means.

8. A fluid pressure controlled vehicle brake apparatus, as recited in claim 6, further characterized in that said pair of spaced-apart stops are carried by said first abutment.

9. A fluid pressure controlled vehicle brake apparatus, as recited in claim 6, further characterized in that said pair of spaced-apart stops are carried by said first abutment, and said valve member is provided with an outturned flange for engagement with said stops.

10. A fluid pressure controlled vehicle brake apparatus, as recited in claim 6, further characterized in that said biasing means comprises a spring interposed between said valve member and said first movable abutment.

* * * * *